US008972798B2

(12) United States Patent
Kakadia et al.

(10) Patent No.: US 8,972,798 B2
(45) Date of Patent: Mar. 3, 2015

(54) PERFORMANCE AND FAULT MANAGEMENT SYSTEM

(71) Applicant: Verizon Patent and Licensing Inc., Basking Ridge, NJ (US)

(72) Inventors: Deepak Kakadia, Union City, CA (US); Benjamin J. Parker, Foster City, CA (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 216 days.

(21) Appl. No.: 13/644,603

(22) Filed: Oct. 4, 2012

(65) Prior Publication Data

US 2014/0101487 A1 Apr. 10, 2014

(51) Int. Cl.
*G06F 11/00* (2006.01)

(52) U.S. Cl.
USPC ........................................................ 714/47.1

(58) Field of Classification Search
CPC . G06F 9/45558; G06F 11/30; G06F 11/3006; G06F 11/301
USPC ...................... 714/25, 27, 37, 47.1, 48; 718/1
See application file for complete search history.

(56) References Cited

U.S. PATENT DOCUMENTS

| 7,702,951 | B2 * | 4/2010 | Yamamoto et al. | 714/6.12 |
| 7,940,676 | B2 * | 5/2011 | Griffin et al. | 370/242 |
| 8,738,972 | B1 * | 5/2014 | Bakman et al. | 714/47.2 |
| 2008/0052394 | A1 * | 2/2008 | Bugenhagen et al. | 709/224 |
| 2011/0023114 | A1 * | 1/2011 | Diab et al. | 726/22 |
| 2011/0225582 | A1 * | 9/2011 | Iikura et al. | 718/1 |
| 2012/0331127 | A1 * | 12/2012 | Wang et al. | 709/224 |
| 2013/0100816 | A1 * | 4/2013 | Bergamasco et al. | 370/237 |
| 2014/0026133 | A1 * | 1/2014 | Parker | 718/1 |

* cited by examiner

*Primary Examiner* — Scott Baderman
*Assistant Examiner* — Joseph Kudirka

(57) ABSTRACT

A network device is configured to receive information from a plurality of device. The network device is configured to further analyze the information and determine that a performance or fault issue exists relating to operation of a device. The network device is configured to further send first information to a user device. The user device is to receive an instruction on eliminating the performance or fault issue. The network device is configured to further receive second information to resolve the performance of fault issue relating to the operation of the device; and send a notification to resolve the performance or fault issue relating to the operation of the device.

20 Claims, 5 Drawing Sheets

PERFORMANCE AND FAULT MANAGEMENT SYSTEM

BACKGROUND

A network device, within a network, may have performance issues, such as excessive queuing rates, and/or fault issues, such as encapsulation errors associated with header formation in data packets, that may be occur during the operation of the network device.

DETAILED DESCRIPTION OF PREFERRED EMBODIMENTS

The following detailed description refers to the accompanying drawings. The same reference numbers in different drawings may identify the same or similar elements.

Systems and/or methods described herein may analyze information about a device, determine whether there is a performance and/or fault issue relating to the device, determine which element within the device, or an element in another device, is the source of the performance and/or fault issue based on relationship information between the different elements and different devices, and implement corrective measures to resolve the performance and/or fault issue associated with the operation of the device. For example, a network manager device may receive information for various devices that host virtual machines. The network manager device may analyze the information by using relationship information regarding different elements, associated with the device, such as the guest operating system, the virtual machine, and the host hardware. The network manager device may analyze the information and may be able to determine which element, associated with the virtual machine and/or associated with the device, is the possible cause of the performance and/or fault issue. The network manager device may take corrective measures to resolve and/or eliminate the performance and/or fault issue.

Figure 1:
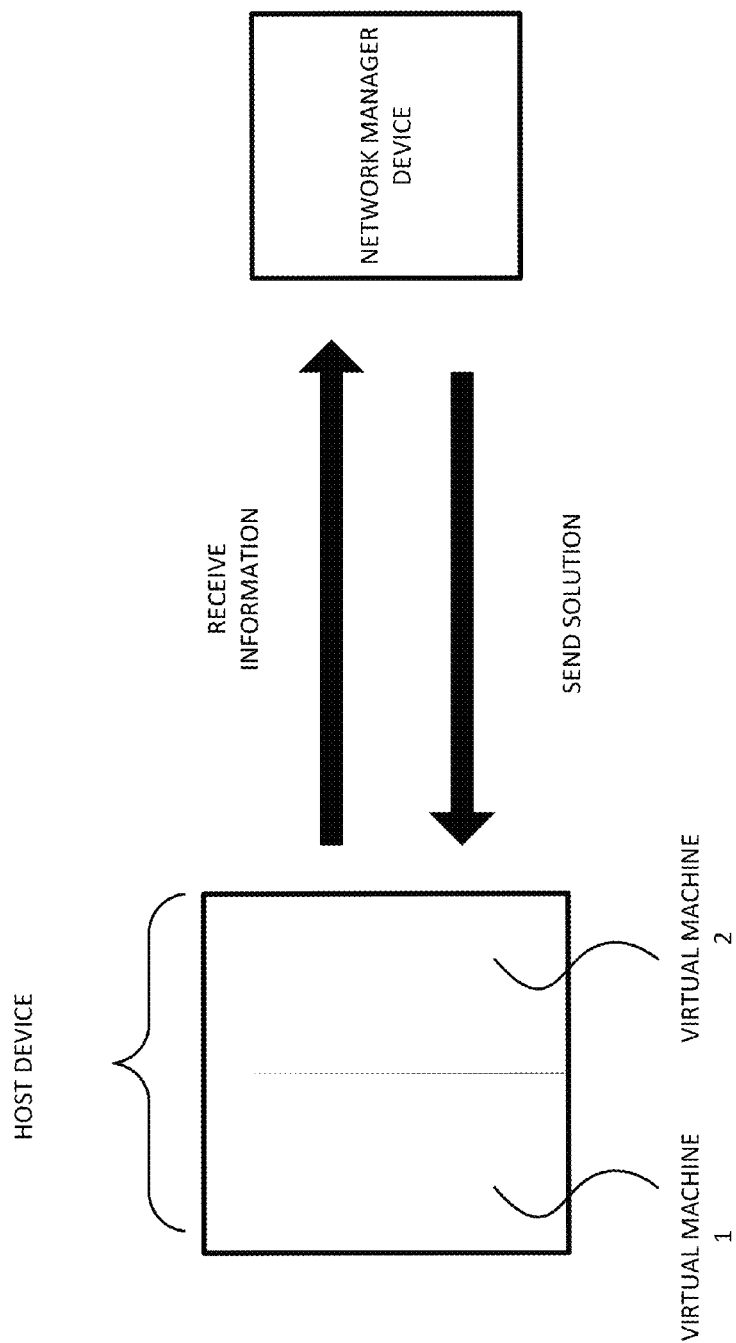
FIG. 1 is a diagram of an overview of an implementation described herein.

FIG. 1 is a diagram of an overview of an implementation described herein. As shown in FIG. 1, a host device is being used to host two virtual machines—virtual machine 1 and virtual machine 2. Assume that the host device is part of a network. Further assume that the host device may receive and send information via the network. Assume that the host device may include different elements, such as a guest operating system, a virtualization layer, a host operating system, and a hardware element to support hosting the virtual machine. The network manager device may receive information about each element in virtual machine 1, virtual machine 2, and the host device. The network manager device may analyze the information to determine whether there is a performance and/or fault issue relating to one or more of the elements within the host device. Further, the network manager device may store relationship information between different elements associated with the virtual machines and/or the host device to determine which element is the source of a performance and/or fault issue. Based on the relationship information and the information received from the host device, the network manager device may determine that there is a performance and/or fault issue, such as excessive traffic usage by virtual machine 1. The network manager device may send a notification to one or more network devices in the network to reduce the flow rate associated with virtual machine 1.

As a result, the network manager device may be able to more accurately determine the source of a performance and/or fault issue when multiple virtual machines are operating on one or more host devices. With the ability to efficiently resolve a performance and/or fault issue, the network manager device may provide a greater level of performance for network devices, such as the host device, and/or the network.

Figure 2:
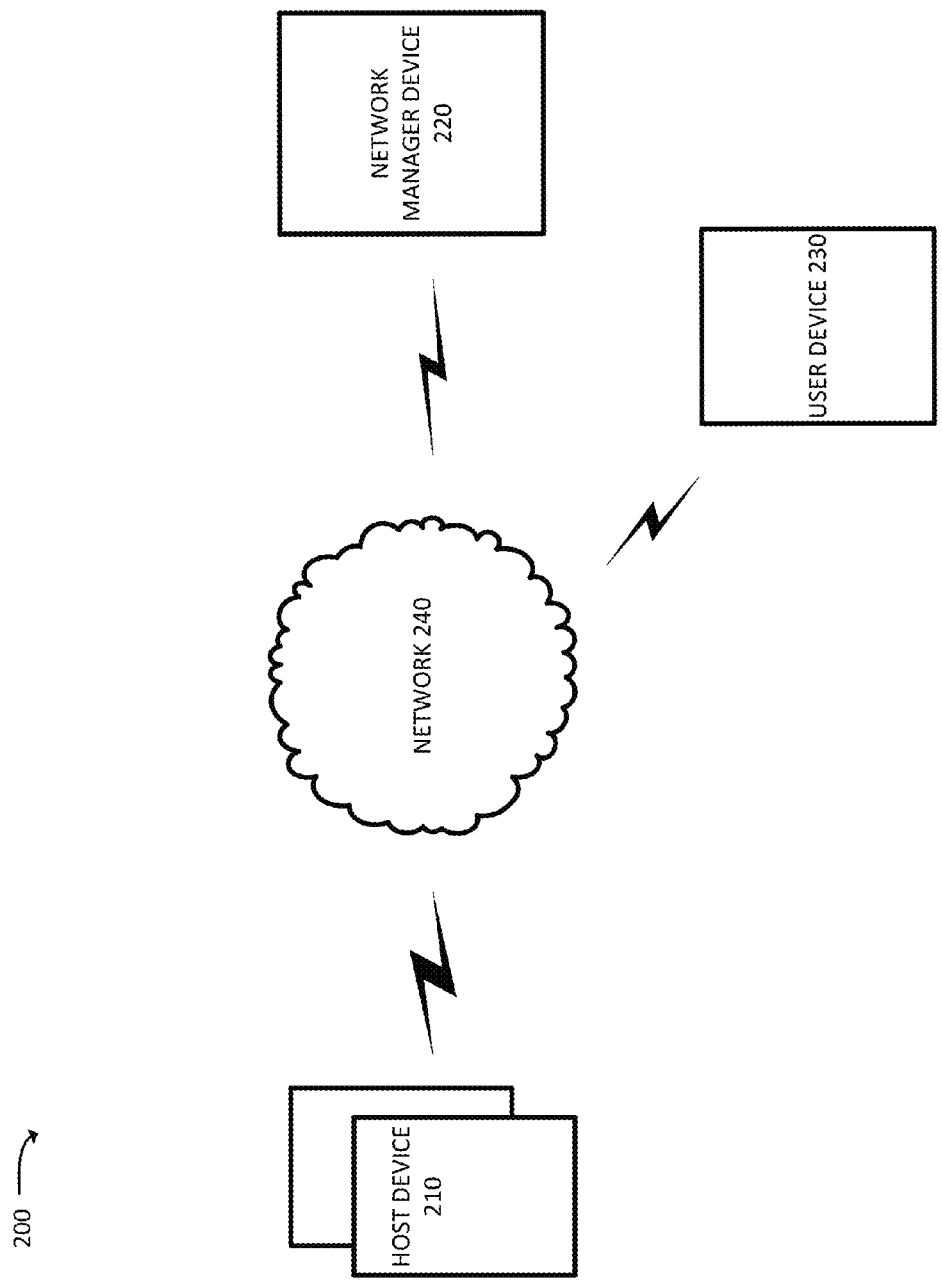
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a host device 210, a network manager device 220, a user device 230, and network 240.

Host device 210 may include one or more network devices, or other types of computation or communication devices that gather, process, search, store, and/or provide information in a manner described herein. Host device 210 may include one or more data processing and/or traffic devices, such as a gateway, router, a modem, a switch, a firewall, a network interface card (NIC), a hub, a bridge, a proxy server, an optical add-drop multiplexer (OADM), or some other type of devices that processes or transfers traffic.

Host device 210 may include a virtual machine, a guest operating system, a virtualization layer, and a host operating system. In some implementations, the virtual machine may be associated with a physical device (e.g., a network device) that may use the hardware of host device 210. In some implementations, the virtual machine may be associated with an application and/or website. The guest operating system may be associated with an operating system associated with the virtual machine. The host operating system may be an operating system associated with host device 210. For example, the host operating system and/or the guest operating system may be Linux, Windows, VMS, OS/400, AIX, or any other type of operating system. The virtualization layer may allow multiple virtual machines and multiple guest operating systems (associated with the multiple virtual machines) to use the host operating system on host device 210. The virtualization layer may allocate hardware and/or software resources associated with host device 210 to one or more virtual machines. The virtualization layer may be a hypervisor (e.g., Xen hypervisor, Kernal Virtual Machine (KVM), Linux virtualization hypervisor, etc.) that may allow guest operating systems (of the virtual machines) to use the host operating system and hardware associated with host device 210.

Network manager device 220 may include one or more network devices, or other types of computation or communication devices, that gather, process, search, and/or provide information in a manner described herein. Network manager device 220 may perform different types of analysis (e.g., flow analysis) on host devices 210 and/or other network devices within network 240. Network manager 220 may analyze the operation of host device 210 and/or other network devices for performance and fault issues.

User device 230 may include any computation or communication device that is capable of communicating with a network (e.g., network 240). For example, user device 230 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a personal computer, a laptop, a tablet computer, or another computation, or communication device.

Network 240 may include a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or a combination of these or other types of networks. Additionally, or alternatively, network 240 may support secure communications via a private network (e.g., a virtual private network (VPN) or a private IP VPN (PIP VPN), and/or secure communications via a public network.

Additionally, or alternatively, network 240 may include a radio access network (RAN), such as a long term evolution (LTE) network, that may include a variety of components to facilitate mobile communications, such as antennas, base stations, mobile switching centers, and interfaces with Public Switched Telephone Networks (PSTNs) and/or packet data servicing nodes (PDSNs).

In some implementations, communications between host device 210, network manager device 220, and user device 230 may be via data packets. The data packets may be defined as Internet Protocol (IP) data packets (associated with IP version 4 (IPv4), IP version 6 (IPv6), or any other IP version), session initiation protocol (SIP) data packets, and/or any other type of data packet.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
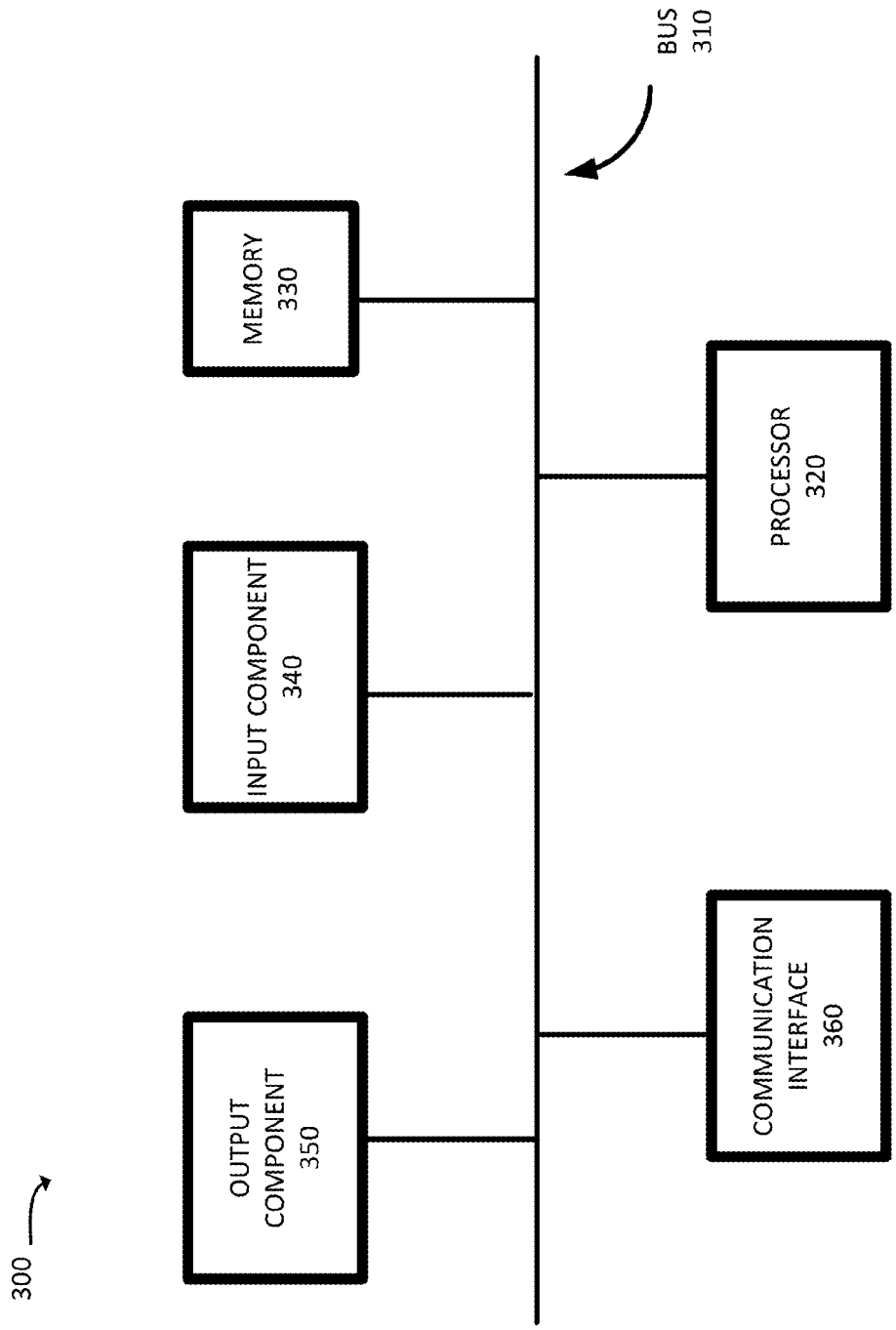
FIG. 3 is a diagram of example components of one or more devices of FIGS. 1 and 2.

FIG. 3 is a diagram of example components of a device 300. Device 300 may correspond to host device 210, network manager device 220, and/or user device 230. Additionally, or alternatively, each of host device 210, network manager device 220, and/or user device 230 may include one or more devices 300 and/or one or more components of device 300.

As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with other networks and/or devices connected to network 240.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Figure 4:
FIG. 4 is a flow chart of an example process for analyzing a device.

FIG. 4 is a flow chart of an example process 400 for analyzing a device. In one implementation, process 400 may be performed by network manager device 220. In another example implementation, one or more blocks of process 400 may be performed by one or more other devices, such as user device 230.

Process 400 may include receiving information about a device (block 410). Network manager device 220 may include or interact with different types of data collection applications to receive information from agents (associated with the different types of data collection applications) regarding different elements within host device 210 and/or other devices. The information may be associated with key performance indicators (KPIs), such as queue occupancy, network utilization, capacity, and/or other types of KPIs. Additionally, or alternatively, the information may be associated with analysis and/or optimization information relating to the operation of one or more elements within host device 210.

The data collection applications may include one or more of the following: simple network management protocol (hereinafter referred to as "SNMP"), Syslog, central processing unit utilization (hereinafter referred to as "CPU utilization"), and/or any other type of data collection application.

SNMP may be a protocol used to monitor the activities of one or more host devices 210. Each host device 210 may have a respective SNMP agent for each of the different elements within host device 210 that may permit network manager device 220 to obtain information regarding the activity of host device 210. For example, network manager device 220 may receive information from SNMP agents associated with the guest operating system, virtualization layer, host operating system, and/or other elements within host device 210. Syslog may store information associated with computer data logging (e.g., recording events such as which other devices communicated with host device 210 and when the other devices communicated with host device 210) that may provide information to network manager device 220 regarding the activity of the network. CPU utilization may include information regarding the amount of time that a network device is active (e.g., how active is host device 210).

In one example implementation, host device 210 (e.g., using a SNMP agent) may send different types of information to network manager device 220 based on a request by network manager device 220. Host device 210 may send information on a constant basis or may send information on an intermittent basis (e.g., send information every minute, every hour, every 12 hours, every day, etc.). The SNMP agent may send information, such as information identifying the amount of data flow, to network manager device 220.

Additionally, or alternatively, the SNMP agent may perform analysis on information and send analysis information to network manager device 220 based on a request by network manager device 220. The SNMP agent may have analytical capabilities that allow the SNMP agent to determine a performance and/or fault issue. For example, for performance issues, the SNMP agent may analyze information and determine a queuing rate (e.g., using Little's formula and/or another queuing formulas) for incoming and outgoing communications regarding host device 210. Additionally, or alternatively, the SNMP agent may determine buffer rates associated with incoming and outgoing communications regarding host device 210. Additionally, or alternatively, the SNMP agent may determine network utilization and/or any other performance issues. For fault issues, the SNMP agent may, for example, analyze information and determine errors associated with headers for data packets, packet dropping rates, hardware errors, software errors, noise, and/or other types of fault issues.

Additionally, or alternatively, the SNMP agent may provide optimization information. For example, the SNMP agent may provide optimization information regarding a compression rate to reduce the size of information sent between host device 210 and network 240. The SNMP agent may also, for example, provide optimization information regarding fault issues.

In another example implementation, host device 210 may send different types of information to network manager device 220 only when a performance and/or fault issue occurs. For example, the SNMP agent may determine that there is excessive buffering associated with the virtualization layer in host device 210 and may send information to network manager device 220 that there is excessive buffering occurring within host device 210. The SNMP agent may, for example, have statistical information on average buffering rates and may compare that information to a buffering rate within a particular element of host device 210. In some implementations, the information may be sent by using a trap message. The trap message may be a message that is initiated by the SNMP agent rather than the SNMP agent sending the information based on a request from network manager 220. Additionally, or alternatively, the SNMP agent may determine that there is an error (e.g., a hardware and/or software error) occurring within host device 210 and may send a trap message to host device 210.

Process 400 may include analyzing the information (block 420). Network manager device 220 may analyze information (described with regard to block 410) received from host device 210 to determine whether there is a performance and/or fault issue regarding host device 210. Network manager device 220 may analyze the information to determine whether there is an element within host device 210 that is using too many network resources and causing a performance issue. Network manager device 220 may analyze the information based on relationship information between virtualized elements (e.g., a virtual machine and/or the guest operating system), the host operating system, the host hardware, and/or the virtualization layer. The relationship information may also include information regarding relationships between performance issues and fault issues. For example, one or more different performance issues (e.g., buffering and queuing issues) may be associated with one or more different fault issues (e.g., error rates) for network traffic associated with host device 210.

The relationship information may be stored in network manager device 220. Additionally, or alternatively, network manager device 220 may receive relationship information from the SNMP agent located on host device 210.

For example, host device 210 may have a first virtual machine associated with a video application and a second virtual machine associated with an audio application. Network manager device 220 may determine that the first virtual machine is sending too much traffic. Network manager device 220 may determine that as a result of sending too much traffic, the first virtual machine is causing excessive queuing which causes buffering times to increase. Additionally, or alternatively, network manager device 220 may determine that there are fault issues. For example, network manager device 220 may determine that there is an error in the header of a data packet associated with the first virtual machine located on host device 210. Network manager device 220 may determine that there is an error in the header based on comparing the header of the data packet with information (stored in network manager device 220) associated with the correct header format (e.g., the correct amount of bytes, the correct components of the header, etc.). Network manager device 220 may determine that the source of the error, in the header of the data packet, is associated with a host operating system on host device 210 based on the relationship information between the different elements as described above.

The relationship information may be changed as the types of virtual machines and/or host devices (such as host device 210) change. For example, host device 210 may add an additional virtual machine which may create additional relationship information between the virtual machine and the other virtual machines stored by network manager device 220.

Network manager device 220 may analyze the information to determine whether there is an element within host device 210 that is causing a fault issue. Network manager device 220 may analyze the information based on the relationship information between different elements of host device 210 as described above. For example, network manager device 220 may determine that the source of a fault occurring at a first virtual machine, within host device 210, is a second virtual machine located on the same host device 210 or on another host device 210. Network manager device 220 may determine that the second virtual machine is the source of the fault occurring at the first virtual machine based on the relationship information (between the first virtual machine and the second virtual machine) stored by network manager device 220.

In some implementations, network manager device 220 may determine, based on the analysis, to implement changes to eliminate, or minimize, a performance and/or fault issue. For example, network manager device 220 may send a notification to host device 210 to take corrective measures to eliminate the performance and/or fault issue. Additionally, or alternatively, network manager device 220 may send a notification to another host device 210 to provide additional capacity so that a particular virtual machine and elements, associated with the particular virtual machine, may avoid performance issues.

Process 400 may include sending analysis regarding the network (block 430). Network manager device 220 may send the results of the analysis to user device 230. User device 230 may receive the results of the analysis. Network manager device 220 may generate the results in a format that can be viewed by a user associated with the provider of services for network 240. The user may be able to view the results on a user interface (e.g., graphical user interface, web page, etc.) on user device 230. The results may graphically describe, to the user, the relationship between different host devices 210, the relationship between different elements within each host device 210, and the relationship of different elements within one host device 210 with elements within another host device 210. User device 230 may display to the user information regarding a performance and/or fault issue. Additionally, or alternatively, user device 230 may display to the user information associating the relationship between the performance and/or fault issue with the source of the performance and/or fault issue. For example, user device 230 may display information that there is an excessive amount of network traffic being sent from host device 210 and that the source of the excessive amount of network traffic is associated with a virtual machine located on another host device 210 that shares the hardware resources used to host the virtual machine.

In some example implementations, the information may be presented by using a graphical user interface. The graphical user interface may display the information to the user of user device 230 by using different text, images, icons, windows, colors, thumbnails, and/or other data within the graphical user interface. Additionally, or alternatively, the graphical user interface may include charts, flow charts, pie charts, and or any other type of chart that may be used to describe a performance and/or fault issue. Additionally, or alternatively, the graphical user interface may display relationship information between different host and virtual elements in one or more host devices 210. For example, the graphical user interface may display a figure for a virtual machine and a figure for a host operating system. The graphical user interface may, for example, show a relationship between the figures and may also show the location (e.g., a graphical object such as cross or a star) indicating the source of a performance and/or fault issue.

Additionally, the graphical user interface may include a graphical representation of the SNMP agent, the relationship of the SNMP agent to a device, and/or the relationship of the SNMP agent to the source of the performance and/or fault issue. For example the graphical user interface may display a label, for example, "agent 1," and agent 1 may be associated with a virtual machine. This may allow a user to understand which SNMP agent is providing the information for the performance and/or fault issue.

User device 230 may display (e.g., via a graphical user interface) to the user a number of options on how to resolve the performance and/or fault issue. For example, the user may be given an option to change network flow destinations, such as sending communications to a first host device 210 instead of sending the communication to a second host device 210. Additionally, or alternatively, the user may also be given an option to change network flow rates, such as reducing the network flow rate to a particular host device 210. Additionally, or alternatively, the user may be provided with analysis that the buffer rate within the guest operating system of host device 210 is 15% higher than the average buffer rate associated with the guest operating system of host device 210. The user may be provided an option for changing the buffer rate for the guest operating system. Additionally, or alternatively, the user may be notified, via the graphical user interface, that packets being sent from a particular virtual machine (on host device 210) have errors in the packet headers. To resolve the fault issue, the user may be provided with an option to switch from that particular virtual machine to another virtual machine. Additionally, or alternatively, the user may also be presented, via user device 230, with other options to resolve a different performance and/or fault issue.

The user may select one or more of the above options by entering one or more commands into user device 230. The command may include information that indicates what steps should be taken to resolve a performance and/or fault issue. User device 230 may receive the input from the user and may send a notification to network manager device 220 to make changes to resolve a performance and/or fault issue. In one example implementation, network manager device 220 may send a message to host device 210 and/or other network devices in network 240 to make changes within host device 210 and/or the operation of other network devices in network 240. For example, network manager device 220 may send a message to host device 210 to reduce the amount of traffic being sent to a particular virtual machine. Additionally, or alternatively, network manager device 220 may send a message to another host device 210 to provide additionally capacity. The additional capacity may be provided by sending a virtual machine to additional host devices 210 and/or virtual machines to provide additional capacity. The additional capacity may be removed once the requirement for additional capacity ends (e.g., the additional capacity was required only during a busy period and may not be required after the busy period). Additionally, or alternatively, network manager device 220 may send a message to the virtualization layer, in host device 210, to correct an error associated with the header of outgoing data packets.

In another example implementation, network manager device 220 may send a message to another network device. The other network device may send a notification to host device 210 to implement correction for performance and/or fault issues as described above.

While series of blocks have been described with regard to FIG. 4, the order of the blocks may be modified in other implementations. Further, non-dependent blocks may be performed in parallel.

Figure 5:
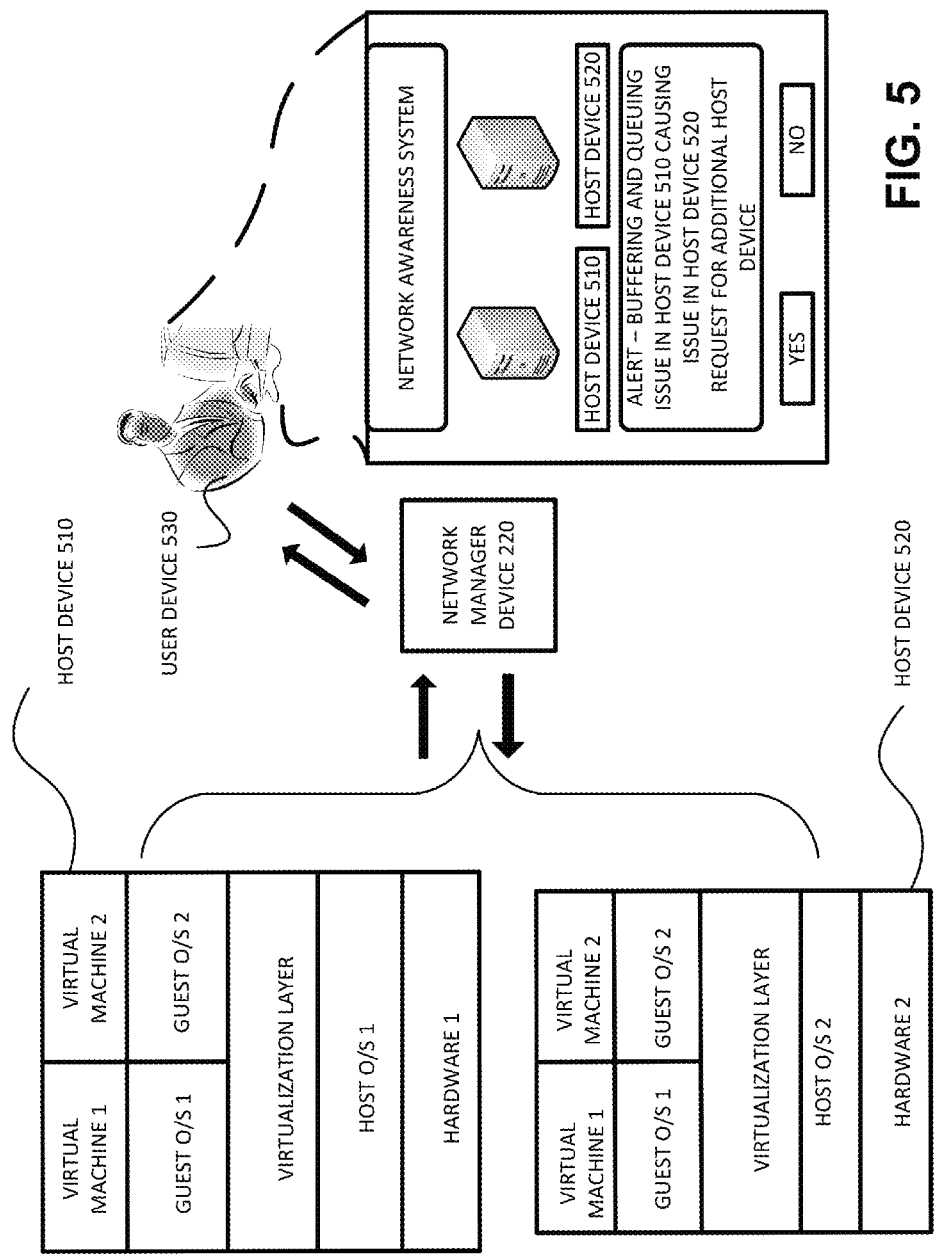
FIG. 5 is a diagram of an example process for analyzing a device.

FIG. 5 is a diagram of an example process for analyzing a device. FIG. 5 shows network manager device 220, a host device 510, a host device 520, and a user device 530. An example of host device 510 and host device 520 may each correspond to host device 210, described with regard to FIG. 2. An example of user device 530 may correspond to user device 230. For the purpose of this example, assume that network manager device 220, host device 510, host device 520, user device 530 communicate with each other via network 240. Further, assume that host device 510, host device 520, user device 530 and network manager device 220 are associated with a service provider of network 240.

As shown in FIG. 5, network manager device 220 may receive information from host device 510 and host device 520. Assume that the network manager device 220 is receiving information via an SNMP agent that is associated with each element within host device 510 and host device 520. Assume that host device 510 and host device 520 are associated with a video application. Further assume that the video application is associated with virtual machine 1 on both host device 510 and host device 520.

Network manager device 220 may analyze the information between the different elements of host device 510 and host device 520 by using relationship information (stored in network manager device 220) to determine a performance and/or fault issue. Based on the information, network manager device 220 may determine that there is an excessive buffering rate occurring at host operation system 1 (host o/s 1) in host device 510. By using the relationship information, network manager device 220 may determine that the excessive buffering rate is associated with excessive network traffic being sent to host device 510 and that the buffering rate is resulting in performance issues in host device 520. Network manager device 220 may determine that host device 510 and host device 520 do not have enough capacity to handle the excessive network traffic. Network manager device 220 may determine that an additional host device is required to resolve the performance issue. Network manager device 220 may send the results to user device 530. A user, of user device 530, may view the analysis results from network manager device 220 via a graphical user interface. The graphical user interface may display, as shown in FIG. 5, an alert regarding an excessive buffering rate associated with both host device 510 and host device 520. The results may include an option to the user that an additional host device is needed to fulfill the capacity requirements of the network traffic being sent to host device 510 and host device 520. The user may select this option, and the user, via user device 530, may send a message to network manager device 220 to bring in an additional host device, in addition to host device 510 and host device 520, to handle the capacity associated with the guest o/s 1 and virtual machine 1. Network manager device 220 may receive the message and may send a command to an additional host device to allocate resources within the additional host device to handle the excessive traffic associated with the guest o/s 1.

As a result, a network manager device may be able to more accurately determine the source of the performance and/or fault issues when multiple virtual machines (applications) are operating on one or more host devices. With the ability to efficiently resolve performance and/or fault issues, the network manager device may provide a greater level of performance for network devices, such as the host device and/or the network.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a network device to:
receive information from a plurality of devices,
the information relating to virtual elements and host elements within the plurality of devices;
analyze the information;
determine, based on analyzing the information and based on relationship information between the virtual elements and the host elements, that a performance or fault issue exists,
the performance or fault issue relating to an operation of a device of the plurality of devices,
when determining that the performance or fault issue exists, the network device is to:
determine that a particular performance issue exists based on a buffering rate associated with a particular host element of the host elements,
the particular host element being associated with an operating system on the device;
send first information to a user device based on determining that the performance or fault issue exists, the first information being used by the user device to receive an instruction to eliminate the performance or fault issue;

receive, based on the user device receiving the instruction, second information to resolve the performance or fault issue relating to the operation of the device; and send, based on receiving the second information, a notification to resolve the performance or fault issue relating to the operation of the device.

2. The system of claim 1, where, when determining that the performance or fault issue exists, the network device is further to:

determine that a fault issue exists,
the fault issue relating to errors within an encapsulation process for creating headers for packets being sent or received by the plurality of devices.

3. The system of claim 1, where, when determining that the performance or fault issue exists, the network device is further to:

determine that a particular fault issue exists based on an error regarding header formation for incoming data packets to the device.

4. The system of claim 1, where, when receiving the information from the plurality of devices, the network device is to:

receive information regarding a first application,
the first application being associated with a first virtual element,
the first virtual element being associated with a first virtual machine located on a first device,
the first device being one of the plurality of devices;
receive information regarding a second application,
the second application being associated with a second virtual element,
the second virtual element being associated with a second virtual machine located on the first device; and
where, when, determining that the performance or fault issues exists, the network device is to:
determine that a particular performance issue, relating to the first virtual machine, is being caused by the second virtual machine.

5. The system of claim 1, where, when determining that the performance or fault issue exists, the network device is to:

determine that a particular performance issue exists based on an amount of queuing associated with the device; and
where, when receiving the second information, the network device is to:
receive an instruction to increase a quantity of the plurality of devices,
the increased quantity of the plurality of devices resulting in a reduction of the amount of queuing associated with the device.

6. The system of claim 1, where, when receiving the information from the plurality of devices, the network device is to:

receive information from multiple simple network management protocol agents,
the multiple simple network management protocol agents being associated with the virtual elements and the host elements within the plurality of devices.

7. The system of claim 6, where, when receiving the information from the multiple simple network management protocol agents, the network device is to:

receive analysis information from the multiple simple network management protocol agents; and
receive optimization information from the multiple simple network management protocol agents.

8. A method comprising:

receiving, by a network device, information from a plurality of devices,
the information relating to virtual elements and host elements within the plurality of devices;
analyzing, by the network device, the information;
determining, by the network device, based on a result of analyzing the information, that a performance or fault issue exists,
the performance or fault issue relating to a device of the plurality of devices,
determining that the performance or fault issue exists including:
determining that a particular performance issue, relating to a first virtual machine, is causing a buffering issue associated with a second virtual machine,
the first virtual machine being located on the device,
the second virtual machine being located on another device of the plurality of devices;
sending, by the network device, first information to a user device based on determining that the performance or fault issue exists,
the first information being used by the user device to receive an instruction to eliminate the performance or fault issue;
receiving, by the network device and based on the user device receiving the instruction, second information from the user device to eliminate the performance or fault issue; and
sending, by the network device and based on receiving the second information, a notification to resolve the performance or fault issue relating to the device.

9. The method of claim 8, where receiving the information from the plurality of devices includes:

receiving information regarding a first application,
the first application being associated with a first virtual element,
the first virtual element being associated with the first virtual machine located on the device; and
receiving information regarding a second application,
the second application being associated with a second virtual element,
the second virtual element being associated with the second virtual machine located on the other device.

10. The method of claim 8, where determining that the performance or fault issue exists further includes:

determining that a particular performance issue exists based on an amount of queuing associated with the device.

11. The method of claim 8, where determining that the performance or fault issue exists further includes:

determining that a particular fault issue, associated with the second virtual machine, is causing the first virtual machine to send data packets with errors.

12. The method of claim 8, where determining that the performance or fault issue exists further includes:

determining that a particular performance issue is associated with a virtual element of the virtual elements,
the virtual element being associated with a virtual machine located on the device.

13. The method of claim 12, where receiving the second information from the user device includes:

receiving a notification to reduce an amount of traffic associated with the virtual machine located on the device.

14. The method of claim 8, where determining that the performance or fault issue exists further includes:

determining that a particular fault issue, associated with a host element of the host elements, exists,
the host element being associated with a host operating system on the device.

15. The method of claim 8, where analyzing the information includes:
analyzing a queuing rate associated with a virtual element of the virtual elements.

16. The method of claim 8, where receiving the information from the plurality of devices includes:
receiving information associated with central processing unit utilization rates.

17. A computer-readable medium comprising:
a plurality of instructions, that when executed by one or more processors of one or more network devices, cause the one or more processors to:
receive information from a plurality of devices,
the information relating to virtual elements and host elements within the plurality of devices;
analyze the information;
determine, based on analyzing the information and based on relationship information between the virtual elements and the host elements, that a performance or fault issue exists,
the performance or fault issue relating to a device of the plurality of devices,
one or more instructions, of the plurality of instructions, to determine that the performance issue or fault issue exists include:
one or more instructions to determine that a fault issue exists,
the fault issue relating to errors within an encapsulation process for creating headers for packets being sent or received by the plurality of devices;
send first information to a user device based on determining that the performance or fault issue exists,
the first information being used by the user device to receive instruction to eliminate the performance or fault issue;
receive, based on the user device receiving the instruction, second information to resolve the performance or fault issue relating to the operation of the device; and
send, based on receiving the second information, a notification to resolve the performance or fault issue relating to the operation of the device.

18. The computer-readable medium of claim 17, where one or more instructions, of the plurality of instructions, to receive the information from the plurality of devices include one or more instructions to:
receive information from multiple agents,
the multiple agents providing information regarding queuing rates in the virtual elements within the plurality of devices.

19. The computer-readable medium of claim 17, where one or more instructions, of the plurality of instructions, to determine that the performance issue or fault issue exists further include one or more instructions to:
determine that a particular performance issue exists based on an amount of queuing associated with the device.

20. The computer-readable medium of claim 17, where one or more instructions, of the plurality of instructions, to receive information from the plurality of devices include one or more instructions to:
receive information regarding flow rates corresponding to traffic associated with the plurality of devices.

* * * * *